Patented Aug. 20, 1935

2,011,908

UNITED STATES PATENT OFFICE 2,011,908

CURED TUNG OIL ACID

Henry Lyne Plummer, Philadelphia, and Leslie Field Stone, Morton, Pa., assignors to E. I. du Pont de Nemours & Company, Wilmington, Del., a corporation of Delaware No Drawing. Application February 18, 1932, Serial No. 593,929

6 Claims. (Cl. 260—8)

This invention relates to coating compositions containing tung oil and more particularly to synthetic resinous compositions into which tung oil or its constituents has been incorporated.

Coating compositions containing tung oil as a drying oil constituent are, as is well known, subject to the disadvantage of producing films which readily frost. Prior attempts to produce a cured tung oil have been concerned chiefly with heating the oil itself and diluting it with various materials. These methods have been more or less ineffective because they do not attain the object sought for, or because of the polymerization and undesirable increase in viscosity which takes place when tung oil is heated to a high temperature. The same disadvantages have also been experienced in coating compositions made with synthetic resins of the polyhydric alcohol-polybasic acid type which contain tung oil in combined form as a constituent. Small amounts of this oil may be incorporated directly into this type of resin by simply allowing the other ingredients of the resinous composition to react in its presence. Another common and more satisfactory way is to replace part of the polybasic acid used in the resinous coating composition by the mixture of acids obtained from the saponification of tung oil. According to this method the glyceride of tung oil acids is synthesized during the process of resinification and thoroughly combined with the resinous substance. Any desired amount of tung oil may be used in this way.

The use of large amounts of tung oil in these resinous compositions is, however, attended by certain disadvantages. The dried film, instead of being clear, frequently presents a frosted appearance similar to that which is obtained with certain oleoresinous varnishes containing large amounts of tung oil. Various methods have been tried in order to overcome this defect, as for instance the use of active driers which control to some extent the tendency of the film to frost. Heating of the ingredients to a high temperature is sometimes resorted to. This, however, results in a resin of very high viscosity which requires a large amount of solvent to bring its solution to a viscosity satisfactory for application, and the film laid down with this solution is too thin to be satisfactory. The solutions also are unstable. Another method which has been used consists of the use of considerable quantities of rosin or other natural gums or other drying or semi-drying oils in conjunction with the synthetic resin. The presence of the rosin does in itself decrease this tendency to frost to some extent and also permits heating the material to a relatively high temperature for a considerable period of time without increasing the viscosity unduly. This method is open to the objection, however, that the presence of the rosin injures the color and the durability of the film. If large amounts are used, it also prevents the drying of the film to a satisfactory condition. The addition of the other oils referred to above in the quantity necessary to prevent frosting of tung oil compositions is objectionable because of slower drying and poor water resistance of the films obtained.

This invention has as an object a process for treating tung oil acids and formulating them into synthetic oils and coating compositions, the films of which are not subject to frosting. Another object is the production of a cured synthetic tung oil. A still further object is the preparation of synthetic resins, and particularly polyhydric alcohol-polybasic acid resinous coating compositions, containing tung oil or its equivalent in considerable quantities, which shall dry satisfactorily without the frosted appearance which very frequently occurs in coating compositions containing considerable quantities of this oil.

We have discovered that while tung oil acids esterified with polyhydric alcohol (as for instance tung oil itself which is the triglyceride of tung oil acids) cannot be heated to a high temperature without polymerization, the isolated tung oil acids can be heated to a high temperature without appreciable polymerization and when so heated the acids are cured in that they may be formulated into coating compositions which do not exhibit the frosting tendency of compositions made from tung oil. This fact makes it possible, when the cured acids are esterified (as for instance with glycerine for the production of synthetic tung oil or synthetic resin), to so alter the unsaturated portion of the tung oil glyceride by heat treatment that frosting will not occur in the film at any time during the drying period or thereafter, provided drier is added as is customary in tung oil compositions. Inasmuch as any tung oil or a varnish or synthetic resin nature, no matter how processed, will frost under some set of drying conditions unless suitable driers are added, we desire it to be understood that by the term "non frosting films" in the claims we mean films obtained from our compositions when they contain a reasonable amount of drier to accelerate the drying of the film, as for instance cobalt drier (containing .03% of metal based on oil content) or its drying equivalent in other metals.

We desire it to be understood that by the term "cured tung oil acids" in the claims we mean tung oil acids which have been heated to a sufficiently high temperature for a sufficient time to impart to the acids the capability of being formulated into coating compositions which exhibit a markedly less tendency to frost than do similar compositions made from the tung oil itself or from the uncured tung oil acids.

A satisfactory heat schedule for curing the tung oil acids is from 540° F. to 585° F. for a period of time varying inversely from twenty to sixty five minutes. Tung oil acids, as well understood by those skilled in the art, are conveniently obtained from tung oil, which is also known as China-wood oil, by any of the common methods usually used in obtaining an acid from an ester such as hydrolysis or saponification.

The method of carrying out our invention is best illustrated by the following examples, I and II, showing the method of producing the cured tung oil acids, the remaining examples showing the methods of utilizing the cured acids.

Example I

Heat tung oil acids to 575° F., hold at this temperature for about 30 minutes and cool and use.

Example II

Heat tung oil acids to 550° F., hold at this temperature for about 50 minutes and cool and use.

Synthetic cured tung oil may be made from the cured acids as follows:

Example III

Heat 310 parts of cured tung oil acids and 92 parts of 100% glycerol or its equivalent of another polyhydric alcohol to about 400° F. Heat at 400° F. until an acid number of about 10 is obtained. The exact proportion of the ingredients will vary somewhat depending on the acid number of the tung oil acids used in the esterification.

The following three examples show the method of incorporating the cured tung oil acids into synthetic resins of the polyhydric alcohol-polybasic acid type:

Example IV

Heat 647.5 parts alkali refined linseed oil and 146 parts C. P. glycerol to 437° F. and add 0.7 parts litharge. Hold at 437° F. until a sample of mixture when cooled is clear and homogeneous (about 20 to 30 minutes). Add 747.6 parts phthalic anhydride and 248.7 parts of the cured tung oil acids of Example I and heat back to 437° F. Add 206 parts C. P. glycerol and heat to 437° F. Hold at this temperature to an acid number of about 35 to 40. A 45% solution in toluol should give a Gardner-Holdt viscosity of about C. Reduce in the appropriate coal tar solvent to desired voltaile content and physical constants. After addition of 15 parts of either cobalt or manganese linoleate solution (containing 2% and 3% metal, respectively) the composition is ready for application.

Example V

Heat 1125.1 parts alkali refined linseed oil and 253.5 parts C. P. glycerol to 437 F. and add 1.2 parts litharge. Hold at 437° F. until a sample of mixture cooled is clear and homogeneous (about 20 to 30 minutes). Add 2392.2 parts phthalic anhydride and 1350.8 parts of the cured tung oil acids of Example I and heat to 392° F. Add 930.5 parts C. P. glycerol and heat to 392° F. Hold at 392° F. to an acid number of 45 to 55. A 50% solution in xylol should give a Gardner-Holdt viscosity of about X. Reduce in the appropriate coal tar solvent to desired volatile content and physical constants. Add 40 parts of either cobalt or manganese linoleate solution (containing 2% and 3% metal, respectively). This resulting varnish is ready for application.

Example VI

Heat 1128.4 parts alkali refined linseed oil and 225.8 parts C. P. glycerol to 437° F. Add 11.3 parts litharge. Hold at 437° F. until a sample of the mixture cooled is clear and homogeneous (about 20 to 30 minutes). Add 1186.4 parts phthalic anhydride and 1083.6 parts of the cured tung oil acids of Example II and heat back to 392° F. Add 395.9 parts C. P. glycerol and heat to 437° F. Hold at 437° F. to an acid number of 35 to 45. A 40% solution in a coal tar naphtha (boiling range 150 to 200° C.) should give a Gardner-Holdt viscosity of about E. Reduce in the appropriate coal tar solvent to desired volatile content and physical constants. Add 35 parts of either cobalt or manganese linoleate solution (containing 2% and 3% metal, respectively). The resulting varnish is ready for application.

Although the above examples are limited to the use of linseed oil in connection with tung oil, it is to be understood that other oils, such as perilla, sunflower or fish oil, may be used if desired. These oils may be incorporated directly as such or they may be incorporated by using the products of their hydrolysis as in the manner well known to those skilled in the art. These resins may also be made with the tung oil acids without the addition of other oil or oil acids, although low acid values cannot be obtained without unduly high viscosities.

The polyhydric alcohols and polybasic acids usually used in the manufacture of polyhydric alcohol-polybasic acid resins may be used in making the improved resins described herein. Other suitable polyhydric alcohols are: ethylene glycol, sorbitol, and pentaerythritol. These and other polyhydric alcohols may also be used instead of glycerol for making the synthetic cured tung oil of Example III. As suitable polybasic acids other than phthalic there may be mentioned succinic and maleic as well as any of the polybasic acids known by those skilled in the art to be useful in the manufacture of polyhydric alcohol-polybasic acid resins. The usual modifying agents such as rosin or other natural gums or resin acids may be included in the reaction mixture of the resin ingredients. The use of these gums is, however, in no way necessary to the practice of this invention.

Other synthetic resins into which fatty oils or oil acids are advantageously incorporated may also be improved by the use of the cured tung oil or oil acids disclosed herein. In making phenol formaldehyde resins for instance, formaldehyde and cresol may be reacted in the presence of the cured tung oil.

This invention makes possible the preparation of improved coating compositions and resins, and particularly polyhydric alcohol-polybasic acid resins, containing substantial proportions of tung oil or its equivalent and having low vicosity characteristics which will dry to a film having satisfactory physical properties and which will not show a frosted appearance. These qualities are secured without the use of rosin or other holding agent. It is also unnecessary in the practice of our invention to use excessive amounts of drier.

Our invention is particularly applicable for the preparation of any resinous composition containing the constituents of tung oil in which the acids of tung oil and glycerine or other polyhydric alcohol are employed.

As many apparently widely different embodiments of this invention may be made without departing from the spirit and scope thereof, it is to be understood that we do not limit ourselves to the specific embodiments thereof except as defined in the following claims:

We claim:

1. A process which comprises heating tung oil acids to a temperature of about 540° F. to 585° F. and thereby obtaining cured tung oil acids.

2. A process of curing tung oil acids which comprises heating tung oil acids at 585° F. to 540° F. for 20 to 65 minutes.

3. A method of making cured synthetic tung oil which comprises curing tung oil acids by heating them to a temperature of about 540° F. to 585° F. and heating the cured acids with a polyhydric alcohol.

4. A method of making cured synthetic tung oil which comprises heating tung oil acids from 585° F. to 540° F. for 20 to 65 minutes and heating the heat treated acids with glycerol.

5. A method of making polyhydric alcohol-polybasic acid resins which comprises curing tung oil acids by heating them at a temperature of about 540° F. to 585° F. and heating the cured acids with an organic polybasic acid and polyhydric alcohol until resinification takes place.

6. A method of making polyhydric alcohol-polybasic acid resins which comprises heating a fatty oil with glycerol and heating the resulting product with cured tung oil acids, phthalic anhydride and glycerol until resinification takes place, said cured tung oil acids being obtainable by heating tung oil acids to a temperature of about 540° F. to 585° F.

HENRY LYNE PLUMMER.
LESLIE FIELD STONE.